(12) United States Patent
Masip et al.

(10) Patent No.: US 6,488,400 B1
(45) Date of Patent: Dec. 3, 2002

(54) ELECTRIC POWERED HAND MIXER

(75) Inventors: Josep-Maria Masip, Sant Cugat del Vallés (ES); Mariano Peñaranda, Barcelona (ES); Robert Ràfols, Sant Fost de Campcentelles (ES); Antonio Rebordosa, Sant Fruitós de Bages (ES)

(73) Assignee: Braun GmbH (DE)

( * ) Notice: Subject to any disclaimer, the term of this patent is extended or adjusted under 35 U.S.C. 154(b) by 0 days.

(21) Appl. No.: 09/635,055

(22) Filed: Aug. 9, 2000

(30) Foreign Application Priority Data

Aug. 20, 1999 (DE) .......................... 199 39 507

(51) Int. Cl.$^7$ ............................................. A47J 43/044
(52) U.S. Cl. ........................................ 366/129; 366/344
(58) Field of Search ................................. 366/129, 344, 366/206, 601; 310/50

(56) References Cited

U.S. PATENT DOCUMENTS

| | | | |
|---|---|---|---|
| 3,170,674 A | * | 2/1965 | Gomersall et al. |
| 3,821,902 A | | 7/1974 | Du Bois et al. |
| 5,316,382 A | * | 5/1994 | Penaranda et al. |
| 5,803,598 A | * | 9/1998 | Harry et al. |
| 6,234,663 B1 | * | 5/2001 | Lecerf et al. |

FOREIGN PATENT DOCUMENTS

| | | |
|---|---|---|
| DE | 7902965 | 6/1979 |
| DE | 28 02 155 A1 | 7/1979 |
| DE | 41 26 721 C1 | 1/1993 |
| DE | 296 04 731 U1 | 7/1996 |
| DE | 297 19 596 U1 | 2/1998 |
| EP | 0 529 266 B1 | 9/1994 |

\* cited by examiner

*Primary Examiner*—Charles E. Cooley
*Assistant Examiner*—David Sorkin
(74) *Attorney, Agent, or Firm*—Fish & Richardson P.C.

(57) ABSTRACT

The invention is directed to an electric powered hand mixer for processing food materials, which is provided with switching arrangements adjustably disposed on a housing (2) and featuring different settings for activation of a continuous-on mode and a pulse mode. Provision is made for tool mounts for holding various tools including, for example, a mixing or kneading tool (3) or a puréeing wand. A lock release element (14) is provided for ejecting a tool held in one of the tool mounts. Provision is made for two switching devices (10, 12) one of which is associated with the activation of the continuous-on mode and one with the activation of the pulse mode. The two switching devices (10, 12) and the lock release element (14) are mechanically coupled to each other so that only one of the two switching devices (10, 12) is actuatable at a time.

9 Claims, 2 Drawing Sheets

ELECTRIC POWERED HAND MIXER

This invention relates to an electric powered hand mixer for processing food materials, with switching arrangements adjustably disposed on a housing and featuring different settings for activation of a continuous on mode and a pulse mode, with tool mounts for holding various tools including, for example, a mixing or kneading tool or a puréeing wand.

BACKGROUND

A hand mixer of this type is known from European patent specification 0 529 266 B1. On the electric powered hand mixer described therein electric switching devices ensure that either a continuous-on mode or a pulse mode is set automatically according to the choice of processing tools. The hand mixer is provided with identical tool mounts for a kneading or mixing tool, and with a further tool mount for a puréeing wand featuring a cutter blade.

The first electric switching device is a main switch which is adjustable to several continuous-on settings featuring different speeds from I to III on the one hand and also into a pulse setting IL on the other hand. Whereas all the operating settings are possible when kneading or mixing tools are inserted in the hand mixer, if a puréeing wand is inserted in the corresponding tool mount—the latter being positioned at a location away from the tool mount for the kneading or mixing tools—the main switch may indeed be moved to the various speed settings but the drive motor can only be switched in the pulse setting; this is owed in particular to a second electric switching device which, when the puréeing wand is inserted, electrically blocks the main switch in its continuous-on settings in order to prevent the cutter blade causing injury in the event of incorrect handling.

On a hand mixer known from DE 79 02 965 U1 it is possible, using a switching device positioned directly adjacent to a release member and with a switching member arranged in a direction transverse thereto, for all three devices to be operatively associated with each other by corresponding stops and abutments. In a first rotary position of the release member this operative relationship can block the release member itself in its axial adjustment and at the same time permit the adjustment of the switching member. In a second rotary position of the release member the latter then permits its axial adjustment, disabling at the same time the adjustment of the switching member. As a result of the special construction of the switching member and the release member it is thus possible with the described hand mixer for either only the switching member to be adjusted in order to switch on the hand mixer or for only the adjustment of the release member to be enabled, causing, upon its actuation, ejection of the kneading or mixing tools in axial direction. The release member is constructed as a slotted sleeve so that in its one rotary position (switch-on position) the switching member is engageable within the slot in order to move the sleeve and in its 90° rotated position (eject position) movement of the switching member is inhibited.

For this hand mixer to be used as a chopper it is also provided with a pulse setting M which enables the appliance to be switched on only for as long as the user keeps the switching member pressed. This requires the release member to be moved first into a rotary position where on the one hand a further inhibiting member is moved into operative association with the switching member, thus preventing the continuous-operation settings I to III from being switched on. On the other hand it is not possible either for the cutter blade to be ejected because, in the pulse setting M, the switching member engages within the slot of the release member, preventing the release member from being displaced in axial direction.

SUMMARY

It is an object of the present invention to provide an electric powered hand mixer of the type initially referred to which, by simple and economical means, enables either a continuous-on mode or a pulse mode to be set and to control these operating modes according to whether mixing and kneading tools or a cutter blade (puréeing wand) are inserted in the appliance.

This object is accomplished by a hand mixer of the present invention, on which the continuous-on mode and the pulse mode can be set independently of each other at different switching devices. These two switching devices are mutually interlocked by mechanical means. To accomplish this, the two switching devices and the lock release element are coupled together for the purpose of providing an interlock. On the one hand this represents a particularly reliable and secure interlocking of the continuous-on mode and the pulse mode, on the other hand it can be manufactured in a particularly simple and hence economical manner.

As a result of the invention's exclusively mechanical linkage between the lock release element and the first and second switching device it is possible for the switching function for the continuous-on mode of the mixing or kneading tool and the switching function for the pulse mode of the puréeing wand to be performed separately from the first and second switching device. The first switching device can only be actuated to activate the continuous-on mode when a mixing or kneading tool is inserted and the lock release element is thus in its upper position. Actuation of the second switching device is then prevented at the same time. The second switching device can only be actuated to activate the pulse mode when no kneading or mixing tool is inserted in the corresponding tool mount, actuation of the first switching device to activate the continuous-on mode being blocked simultaneously. And finally, the lock release element cannot be actuated to eject an inserted mixing or kneading tool when the continuous-on mode is activated.

The interlocking members for establishing the mutual operative relationships comprise simple projections and corresponding bores or recesses on or in the lock release element, the first switching device and the second switching device.

As a result of other features of the invention, the lock release element is axially displaceable in its longitudinal direction, with the displacement in upward direction being performed by inserting the mixing or kneading tools. Displacement of the lock release element in downward direction is initiated during ejection of the mixing or kneading tools by pressing down onto the release button of the lock release element. When mixing or kneading tools are in inserted position, the interlocking members of the lock release element and the switching device are in relative alignment so that the switching device can be moved to its operating settings. Ejection of the mixing or kneading tools is impossible in this setting. When mixing or kneading tools are in ejected position, the lock release element is so far from the interlocking member of the switching device that, during movement of the switching device, the former inhibits movement of the latter, making it impossible to switch on. In this position it is only possible to actuate the pulse switching device, which is aligned in turn with an interlocking member of the switching element.

As a result of other features of the invention, it is possible for the first switching device to be displaced in longitudinal direction of the hand mixer housing surface in what amounts to a particularly simple mode of operation.

Another feature of the invention enables the first switching device to be displaced in longitudinal direction of the hand mixer surface and the second switching device to be displaced simultaneously in vertical direction to said surface. These two orthogonal directions of movement of the two switching devices enable easy operation without any need to provide the user with special explanations for moving the switching devices.

Another feature of the invention results in a particularly simple, easy to manufacture mechanical construction of the interlocking device. At this point it should be noted that, in the interest of simplicity, the two electric switches for actuating the two switching devices are not shown in the drawing because they are not visible in this plane. Nor are the guides of the switching devices in the housing shown in any detail. The same applies for the motor, gearing, cables and other internal parts of a hand mixer.

Other features of the invention result in particularly simple embodiments of the second switching device without any need for elaborate components.

Further features, application possibilities and advantages of the present invention will become apparent from the subsequent description of embodiments of the invention illustrated in the Figures of the accompanying drawings. It will be understood that any single feature and any combination of single features described or represented by illustration form the subject-matter of this invention, irrespective of how they are summarized in the patent claims or their back references and irrespective of their wording and representation in the description and drawings, respectively.

DETAILED DESCRIPTION

In the following description the positional terms "vertical", "horizontal", "upper" and "lower" refer to the hand mixer as positioned in FIGS. 1 and 2.

Figure 1:
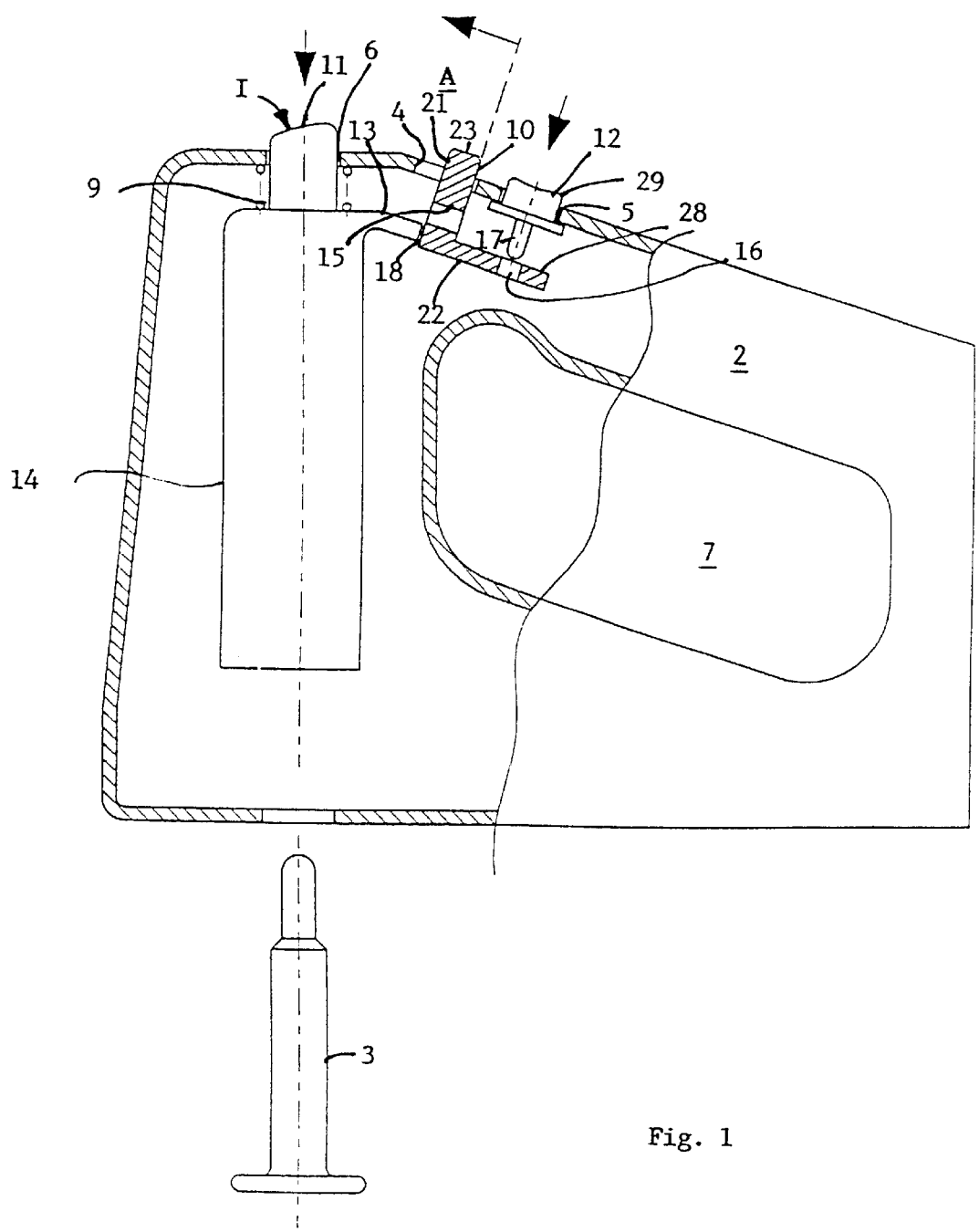
FIGS. 1 and 2 are schematic and partly sectional side views of a hand mixer of the present invention, illustrating a first and a second operating setting.

FIG. 1 shows a hand mixer which is essentially comprised of a housing 2 and a clearance space 7 through which the user can insert his hand for holding the appliance. In the left front section of the housing 2 is a vertically adjustable lock release element 14 and in its upper section are a first switching device 10, which can be moved roughly transverse to the direction of adjustment of the lock release element 14, and a second switching device 12, which can be moved vertically to the direction of adjustment of the first switching device 10.

The first switching device 10 is designed to switch on and off a drive mechanism for a continuous-on mode of a slow running tool, e.g., a mixing or kneading tool. For this purpose the first switching device 10 can be maintained in two switch settings. The second switching device 12 is designed to switch on and off a drive mechanism for a pulse mode of a fast running tool, e.g., a puréeing wand. The second switching device 12 is constructed as a momentary-contact switch which has to be kept pressed in the "on" position.

In FIG. 1 the lock release element 14 is in a lower idle position I in which a mixing or kneading tool 3 schematically indicated in the bottom part of FIG. 1 is not inserted. The lock release element 14 has an upper release button 11 which protrudes from a bore 6 in the surface of the housing 2. A spring element 9 exerts a biasing force on the lock release element 14 in downward direction into the idle position I shown in FIG. 1.

The lock release element 14 is equipped at its upper end with a projection which acts as a first interlocking member 13 and is angled in the direction of adjustment of the first switching device 10.

The lock release element 14 is also coupled to a tool mount in which the mixing or kneading tool 3 can be inserted. A further tool mount for holding a puréeing wand equipped with a rotary cutter blade is provided likewise in the housing 2. The second tool mount for accommodating a puréeing wand is arranged coaxially or at a different location in the housing 2 and, where applicable, also in a different axial position than the tool mount for accommodating the mixing or kneading tool 3.

The first switching device 10 is of integral and angular construction and is adjustably mounted roughly parallel to the adjoining surface of the housing 2. The first switching device 10 includes a first leg 21 which is arranged roughly vertical to the adjoining surface of the housing 2 and has at its free upper end an actuating member 23 which projects through and beyond a cutout 4 in the housing 2 surface and serves to actuate the first switching device 10 by hand.

The first leg 21 of the first switching device 10 stands vertically on a second leg 22 which is arranged in the direction of adjustment of the first switching device 10.

In FIG. 1 the first switching device 10 occupies a first position A, and the projection of the lock release element 14 forming the first interlocking member 13 engages a seating surface 18 at the front of the first switching device 10 facing the lock release element 14, thus blocking the first switching device 10. Hence in the first position A shown in FIG. 1 it is impossible for the first switching device 10 to be actuated. As a result, the continuous-on mode of the drive mechanism for the slow running tool cannot be selected.

By contrast, with the first switching device 10 in position A, the second switching device 12 can be used for activating the drive mechanism of the fast running tool in a pulse mode because a pin 17 projecting from the underside of the second switching device 12 is insertable in a bore 16 of the leg 22 of the first switching device 10, said bore being in alignment with the pin 17 in this position A. It is thus possible to activate the pulse mode by pressing on a push-button 29 of the second switching device 12 projecting through a bore 5 in the housing 2.

In idle position I of the lock release element 14 shown in FIG. 1 and in position A of the first switching device 10, the interlocking members constructed on the lock release element 14 and on the first and second switching device 10 and 12 help to prevent activation of the continuous-on mode by actuation of the first switching device 10. At the same time activation of the pulse mode by the second switching device 12 is enabled.

Furthermore, in the operating setting of the hand mixer shown in FIG. 1 the spring element 9 also operates to prevent the lock release element 14 from being moved in upward direction. This can only be effected by an inserted mixing or kneading tool 3.

Figure 2:
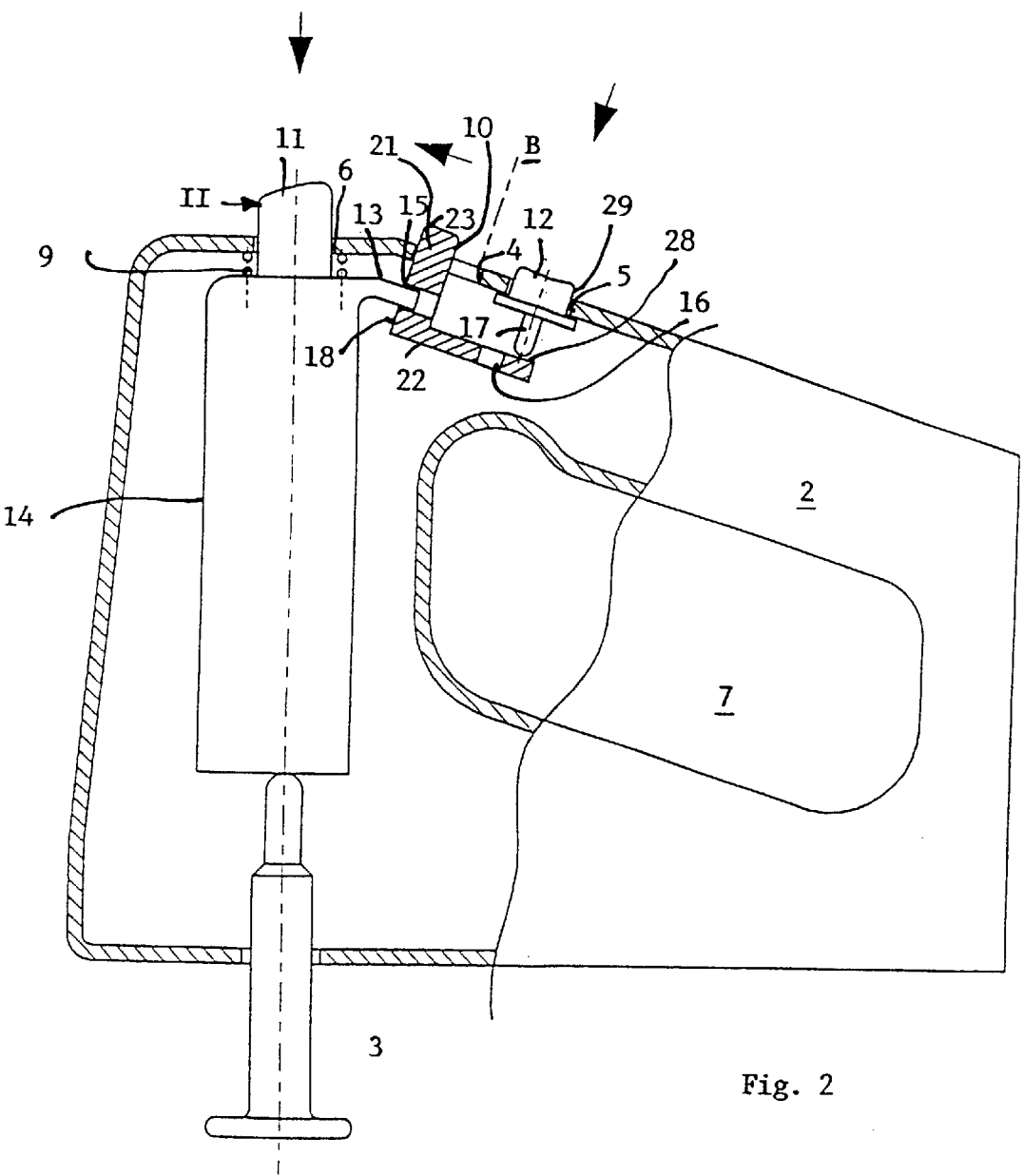

In the upper position II of the lock release element 14 shown in FIG. 2, in which a mixing or kneading tool 3 is inserted in the tool mount connected to the lock release element 14, the projection forming the first interlocking member 13 is able to engage in a recess or bore 15 provided in the first leg 21 of the first switching device 10. Hence the first switching device 10 with its actuating member 23 can be urged manually in the direction of the lock release element 14 and thus be switched to the continuous-on mode. This is position B of the first switching device 10.

The mutual interlocking of the projection 13 and the bore or recess 15 also means that the lock release element 14 cannot be actuated with the release button 11 for disengagement of the kneading or mixing tool 3 when the continuous-on mode is activated. In this position B it is not possible therefore for the mixing or kneading tool 3 to be ejected with the release button 11.

In position B of the first switching device 10 shown in FIG. 2, the pin 17 of the second switching device 12, which is associated with the second leg 22 of the first switching device 10, has its forward end in abutting engagement with an abutment surface 28 constructed on the free end of the second leg 22 of the first switching device 10 so that activation of the pulse mode by the second switching device 12 is blocked.

As shown in FIG. 1 and FIG. 2, the release button 11 of the lock release element 14, the actuating member 23 of the first switching device 10 and the pushbutton 29 of the second switching device 12 are arranged in close proximity to each other in the upper part of the housing 2 so that these actuating members, i.e., the release button 11, the actuating member 23 and the pushbutton 29, can be actuated by a user with his thumb without requiring the user to change the grip of his hand through the clearance space 7 on the hand mixer.

The safety measures described in the foregoing are effected in the hand mixer by purely mechanical means, i.e., by a simple mechanical design of the projection 13 on the lock release element 14 and the first switching device 10 in conjunction with the second switching device 12, whose direction of actuation is vertical to the direction of adjustment of the first switching device 10.

What is claimed is:

1. An electric powered hand mixer for processing food materials comprising:
    a housing;
    an electric motor;
    a switching arrangement adjustably disposed on the housing and featuring different settings for activation of a continuous-on mode and a pulse mode of the motor, the switching arrangement including a first and a second switching device, said first switching device having a first position associated with the activation of the continuous-on mode and a second position associated with deactivation of the continuous-on mode, said second switching device having a first position associated with the activation of the pulse mode and a second position associated with deactivation of the pulse mode;
    a tool mount for holding various tools; and
    a lock release element for ejecting a tool held in the tool mounts
    wherein said first switching device, said second switching device and said lock release element are mechanically coupled to each other so that only one of the two switching devices is actuatable at a time.

2. The hand mixer of claim 1, wherein:
    the lock release element is movable between a lower idle position and an upper position and includes a first interlocking member; and
    the first switching device includes a second interlocking member associated with said first interlocking member, and
    wherein said first and said second interlocking members interengage when said lock release element is in said lower idle position to inhibit an adjustment of the first switching device from its second position to its first position and said first and said second interlocking members disengage when said lock release element is in said upper position to enable the adjustment of the first switching device from its second position into its first position.

3. The hand mixer of claim 2, wherein:
    the first switching device includes a third interlocking member aligned relative to the second switching device,
    the second switching device includes a fourth interlocking member associated and cooperating with the third interlocking member, and p1 wherein the third and fourth interlocking members cooperate to enable adjustment of the second switching device from its second to its first position when the lock release element is in its lower idle position, and the third and fourth interlocking members cooperate to inhibit adjustment of the second switching device from its second position to its first position when the lock release element occupies its upper position.

4. The hand mixer of claim 3, wherein the first switching device is mounted for adjustment in a direction parallel to an adjoining surface of the housing, the first switching device including a leg having an actuating member for manual operation of the first switching device, said actuating member projecting through and beyond a cutout in the housing.

5. The hand mixer as claimed in claim 4, wherein the first switching device is provided with a second leg, the first and the second leg being roughly mutually perpendicular to each other, the first leg being aligned about normal to the adjoining surface of the housing, the second leg being aligned about parallel to said adjoining surface.

6. The hand mixer of claim 5, wherein the first interlocking member includes a projection connected with the lock release element and having a free end, the second interlocking member includes a seating surface facing the lock release element and a recess or bore directly adjacent to said seating surface, the free end of the first interlocking member engaging said seating surface of the second interlocking member when the lock release element is in the lower idle position, whilst engaging within the recess or bore of the second interlocking member when the lock release element is in the upper position.

7. The hand mixer of claim 6, wherein the second switching device is actuatable in a direction normal to the adjoining surface of the housing and includes a manually operable pushbutton extending through a bore in the adjoining surface and a pin oriented normal to said direction of adjustment of the first switching device.

8. The hand mixer of claim 7, wherein the pin is associated with a bore of the first switching device, said pin being insertable into said bore when the lock release element is in the idle position, such insertion being inhibited when the lock release element is in the upper position and the first switching device is actuated.

9. The hand mixer of claim 7, wherein the actuating member and the pushbutton are arranged in close vicinity to each other.

* * * * *

UNITED STATES PATENT AND TRADEMARK OFFICE
CERTIFICATE OF CORRECTION

PATENT NO.   : 6,488,400 B1
DATED        : December 3, 2002
INVENTOR(S)  : Antonio Rebordosa et al.

It is certified that error appears in the above-identified patent and that said Letters Patent is hereby corrected as shown below:

<u>Column 5,</u>
Line 58, delete "mounts" and insert -- mount --

<u>Column 6,</u>
Line 19, delete "P1" after "and"

Signed and Sealed this

Twenty-fourth Day of February, 2004

JON W. DUDAS
*Acting Director of the United States Patent and Trademark Office*